United States Patent
Ren et al.

(10) Patent No.: US 11,792,766 B2
(45) Date of Patent: Oct. 17, 2023

(54) POSITIONING METHOD, DEVICE, SYSTEM, TERMINAL, LMF ENTITY, AND MEDIUM

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Hui Li, Beijing (CN); Deshan Miao, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 207 days.

(21) Appl. No.: 17/431,176

(22) PCT Filed: Jan. 15, 2020

(86) PCT No.: PCT/CN2020/072322
§ 371 (c)(1),
(2) Date: Aug. 16, 2021

(87) PCT Pub. No.: WO2020/164361
PCT Pub. Date: Aug. 20, 2020

(65) Prior Publication Data
US 2022/0150866 A1 May 12, 2022

(30) Foreign Application Priority Data
Feb. 14, 2019 (CN) .......................... 201910115184.9

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0252* (2013.01); *G01S 5/10* (2013.01); *H04W 16/28* (2013.01)

(58) Field of Classification Search
CPC ... H04W 64/006; H04W 16/28; H04W 4/026; H04W 4/02; H04W 64/00; G01S 5/0252;
(Continued)

(56) References Cited

U.S. PATENT DOCUMENTS 10,327,109 B1 * 6/2019 Maheshwari ......... H04W 4/029
10,736,074 B2 * 8/2020 Edge ...................... G01S 1/0428
(Continued)

FOREIGN PATENT DOCUMENTS

CN 104010362 A 8/2014
CN 108702585 A 10/2018
(Continued)

*Primary Examiner* — Kabir A Timory
(74) *Attorney, Agent, or Firm* — KILPATRICK TOWNSEND & STOCKTON, LLP

(57) ABSTRACT

A positioning method, a device, a system, a terminal, an LMF entity, and a medium, used to solve the problem of low positioning accuracy of UE-based OTDOA in the prior art. The method includes a terminal sending to a location management function (LMF) entity an auxiliary positioning data request message includes first identification information of a beam reference signal detected by the terminal itself, receiving from the LMF entity auxiliary positioning data of beam direction information of a beam reference signal including second identification information, and the second identification information is identification information of a beam reference signal sent by a neighboring base station and determined, according to the first identification information, by the LMF entity as being detectable by the terminal, and determining an RSTD of each beam reference signal having the first identification information or the second identification information, and determining position
(Continued)

information of the terminal according to the determined RSTD and a beam direction of each beam reference signal.

20 Claims, 7 Drawing Sheets

(51) Int. Cl.
*G01S 5/10* (2006.01)
*H04W 16/28* (2009.01)

(58) Field of Classification Search
CPC . G01S 5/10; G01S 5/0236; G01S 1/20; H04L 5/0048; H04B 7/0617; H04B 7/0626; H04B 7/06
See application file for complete search history.

(56) References Cited

U.S. PATENT DOCUMENTS

| | | |
|---|---|---|
| 2017/0111880 A1 | 4/2017 | Park et al. |
| 2018/0024225 A1 | 1/2018 | Chae et al. |
| 2018/0098279 A1 | 4/2018 | Edge |
| 2018/0199160 A1 | 7/2018 | Edge |
| 2018/0324022 A1 | 11/2018 | Sheng et al. |
| 2019/0037338 A1 | 1/2019 | Edge et al. |
| 2019/0037529 A1 | 1/2019 | Edge et al. |

FOREIGN PATENT DOCUMENTS

| | | |
|---|---|---|
| WO | 2015027118 A1 | 2/2015 |
| WO | 2017164925 A1 | 9/2017 |
| WO | 2018217323 A1 | 11/2018 |

* cited by examiner

POSITIONING METHOD, DEVICE, SYSTEM, TERMINAL, LMF ENTITY, AND MEDIUM

The present application is a National Stage of International Application No. PCT/CN2020/072322, filed on Jan. 15, 2020, which claims the priority from Chinese Patent Application No. 201910115184.9, filed with the Chinese Patent Office on Feb. 14, 2019 and entitled "Positioning Method, Device, System, Terminal, LMF Entity, and Medium", both of which are hereby incorporated by reference in their entireties.

FIELD OF DISCLOSURE

The present application mainly relates to the field of wireless communication technology, and in particular to a positioning method, device, system, terminal, LMF entity and medium.

BACKGROUND

The Downlink Observed Time Difference of Arrival (DL-TDOA) is a positioning method defined by the 3GPP protocol specification. The current DL-TDOAs are mainly divided into UE-assisted DL-TDOA and UE-based DL-TDOA, and the basic principle of the UE-based DL-TDOA is: a User Equipment (UE) measures the downlink Positioning Reference Signals (PRSs) and/or Downlink Reference Signals (DL-RSs) sent from multiple Transmission Points (TPs) to obtain a measurement value of the Reference Signal Time Difference (RSTD) of arrival to the UE, and acquires the DL-TDOA assistance information associated with the cell, e.g., physical cell ID, cell antenna position and PRS configuration, etc., through the Location Management Function (LMF) entity. Then the position of the UE itself is calculated based on the positioning algorithm according to the RSTD and DL-TDOA assistance information.

In the current UE-based DL-TDOA positioning scheme, the DL-TDOA assistance information exchanged among a Base Station (BS), an LMF entity and a UE includes, for example, physical cell ID, cell antenna position and PRS configuration, etc. However, the 5G New Radio System (NR) supports the transmission of multiple signal beams in different directions in all frequency ranges. For example, the protocol stipulates that a Synchronization Signal block (SSB) set can contain up to L SSBs, for example, L=4 in the frequency band below 3 GHz, L=8 in the frequency band between 3 GHz and 6 GHz, L=64 in the frequency band above 6 GHz. The transmission beam directions of the SSBs are generally different. Similarly, the beam directions of downlink positioning reference signals used to support the UE positioning are also diverse. However, if the UE is unable to search for a downlink positioning reference signal that supports the accurate positioning based on only the measured value RSTD, the antenna position of the cell and other information, the positioning accuracy of the UE-based DL-TDOA is reduced.

BRIEF SUMMARY

Some embodiments of the present application provide a positioning method, device, system, terminal, LMF entity and medium, to solve the problem of low positioning accuracy of the UE-based DL-TDOA in the prior art.

An embodiment of the present application provides a positioning method, which is applied to a terminal and includes:

sending, by a terminal, a positioning assistance data request message to an LMF entity, and the positioning assistance data request message contains first identification information of a beam reference signal detected by the terminal;

receiving positioning assistance data containing beam direction information of a beam reference signal of second identification information sent by the LMF entity, and the second identification information is identification information of a beam reference signal sent by a neighboring base station and determined according to the first identification information and being detectable by the terminal;

determining a Reference Signal Time Difference measurement, RSTD, of each beam reference signal among beam references signals corresponding to the first identification information and beam references signals corresponding to the second identification information, and determining location information of the terminal according to each determined RSTD and a beam direction of the each beam reference signal.

Further, the beam reference signal is a DL-RS and/or a downlink PRS.

Further, if the beam reference signal is a DL-RS, the positioning assistance data request message further includes signal strength information of the DL-RS.

Further, the first identification information is an SSB index of a beam reference signal, or an index of a channel state indication reference signal; and the second identification information is an SSB index of a beam reference signal, or an index of a channel state indication reference signal.

Further, before the terminal sends the positioning assistance data request message to the LMF entity, the method further includes:

receiving a positioning capability request message sent by the LMF entity;

sending a positioning capability provision message to the LMF entity, and the positioning capability provision message contains a positioning capability supported by the terminal.

Further, the receiving positioning assistance data containing beam direction information of a beam reference signal of second identification information sent by the LMF entity, includes:

receiving, by the terminal, positioning assistance data containing beam direction information of a beam reference signal of second identification information sent by the LMF entity and forwarded by a base station that provides services for the terminal.

Further, the determining location information of the terminal according to each determined RSTD and a beam direction of each beam reference signal, includes:

determining first reference location information of the terminal according to each RSTD and a preset RSTD positioning algorithm;

determining an Angle Of Arrival (AOA) at which a base station that sends a beam reference signal corresponding to each second identification information arrives at the terminal according to a beam direction of the beam reference signal corresponding to the second identification information, and determining second reference location information of the terminal based on a preset AOA positioning algorithm;

determining the location information of the terminal according to preset weight values corresponding to the first reference location information and second reference location information as well as the first reference location information and second reference location information.

Further, the determining location information of the terminal according to each determined RSTD and a beam direction of each beam reference signal, includes:

determining an AOA at which a base station that sends a beam reference signal corresponding to each second identification information arrives at the terminal according to a beam direction of the beam reference signal corresponding to the second identification information;

determining the location information of the terminal by using a joint positioning algorithm of preset RSTD timing parameters and AOA angle parameters according to each RSTD and each AOA.

Further, after determining the location information of the terminal, the method further includes:

sending a positioning information provision message containing the location information of the terminal to the LMF entity.

An embodiment of the present application provides a positioning method, which is applied to an LMF entity and includes:

receiving a positioning assistance data request message sent by a terminal, and the positioning assistance data request message contains first identification information of a beam reference signal detected by the terminal;

determining second beam information of a second beam reference signal sent by an adjacent base station that can be detected by the terminal according to the first identification information, and acquiring beam direction information of a beam reference signal containing the second identification information;

sending positioning assistance data containing the beam direction information of the beam reference signal corresponding to the second identification information to the terminal.

Further, the beam reference signal is a DL-RS and/or a downlink PRS.

Further, if the beam reference signal is a DL-RS, the positioning assistance data request message further includes signal strength information of the DL-RS.

Further, if the beam reference signal is a DL-RS, the positioning assistance data further includes a Quasi Co-Location (QCL) association relationship between a DL-RS beam and a DL-PRS beam.

Further, before receiving the positioning assistance data request message sent by the terminal, the method further includes:

sending a positioning capability request message to the terminal when detecting that the terminal is in a Radio Resource Control-CONNECTED (RRC) state;

receiving a positioning capability provision message containing a positioning capability supported by the terminal sent by the terminal.

Further, the sending positioning assistance data containing the beam direction information of the beam reference signal corresponding to the second identification information to the terminal, includes:

sending, by the LMF entity, the positioning assistance data containing the beam direction information of the beam reference signal corresponding to the second identification information to a base station serving the terminal, so that the base station forwards the positioning assistance information to the terminal.

Further, the acquiring beam direction information of a beam reference signal containing the second identification information, includes:

sending, by the LMF entity, a DL-TDOA information request message containing the second identification information to each base station in an NR system;

receiving a DL-TDOA information response message sent by each base station, and the DL-TDOA information response message contains the beam direction information of the beam reference signal corresponding to the second identification information.

An embodiment of the present application provides a terminal, which includes a processor, a memory and a transceiver;

and the processor is configured to read programs in the memory to: send a positioning assistance data request message to an LMF entity, and the positioning assistance data request message contains first identification information of a beam reference signal detected by the terminal; receive positioning assistance data containing beam direction information of a beam reference signal of second identification information sent by the LMF entity, and the second identification information is identification information of a beam reference signal sent by a neighboring base station and determined according to the first identification information and being detectable by the terminal; determine each RSTD of beam reference signals of the first identification information or the second identification information, and determine location information of the terminal according to each determined RSTD and a beam direction of each beam reference signal;

the transceiver is configured to send the positioning assistance data request message to the LMF entity and receive the positioning assistance data containing the beam direction information of the beam reference signal corresponding to the second identification information sent by the LMF entity.

Further, the processor is further configured to: receive a positioning capability request message sent by the LMF entity before the terminal sends the positioning assistance data request message to the LMF entity; and send a positioning capability provision message to the LMF entity, and the positioning capability provision message contains a positioning capability supported by the terminal.

Further, the processor is configured to: receive the positioning assistance data containing the beam direction information of the beam reference signal corresponding to the second identification information sent by the LMF entity and forwarded by a base station that provides services for the terminal.

Further, the processor is configured to: determine first reference location information of the terminal according to each RSTD and a preset RSTD positioning algorithm; determine an Angle Of Arrival (AOA) at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and second reference location information.

Further, the processor is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

Further, the processor is further configured to: send a positioning information provision message containing the location information of the terminal to the LMF entity after determining the location information of the terminal.

An embodiment of the present application provides an LMF entity, which includes: a processor, a memory and a transceiver;

and the processor is configured to read programs in the memory to: receive a positioning assistance data request message sent by a terminal, wherein the positioning assistance data request message contains first identification information of a beam reference signal detected by the terminal; determine second beam information of a second beam reference signal sent by a neighbouring base station and being detectable by the terminal according to the first identification information, and acquire beam direction information of a beam reference signal containing the second identification information; and send positioning assistance data containing the beam direction information of the beam reference signal corresponding to the second identification information to the terminal;

the transceiver is configured to receive the positioning assistance data request message sent by the terminal and send the positioning assistance data containing the beam direction information of the beam reference signal corresponding to the second identification information to the terminal.

Further, the processor is further configured to: before receiving the positioning assistance data request message sent by the terminal, send a positioning capability request message to the terminal when detecting that the terminal is in a Radio Resource Control-CONNECTED (RRC) state; and receive a positioning capability provision message containing a positioning capability supported by the terminal sent by the terminal.

Further, the processor is configured to: send the positioning assistance data containing the beam direction information of the beam reference signal corresponding to the second identification information to a base station serving the terminal, so that the base station forwards the positioning assistance information to the terminal.

Further, the processor is configured to: send a DL-TDOA information request message containing the second identification information to each base station in an NR system; and receive a DL-TDOA information response message sent by each base station, and the DL-TDOA information response message contains the beam direction information of the beam reference signal corresponding to the second identification information.

An embodiment of the present application provides a positioning device, which is applied to a terminal and includes:

a first sending device configured to send a positioning assistance data request message to an LMF entity, and the positioning assistance data request message contains first identification information of a beam reference signal detected by the terminal;

a first receiving device configured to receive positioning assistance data containing beam direction information of a beam reference signal of second identification information sent by the LMF entity, and the second identification information is identification information of a beam reference signal sent by a neighboring base station and determined according to the first identification information and being detectable by the terminal;

a first determining device configured to determine a Reference Signal Time Difference measurement, RSTD, of each beam reference signal among beam references signals corresponding to the first identification information and beam references signals corresponding to the second identification information, and determine location information of the terminal according to each determined RSTD and a beam direction of the each beam reference signal.

An embodiment of the present application provides a positioning device, which is applied to an LMF entity and includes:

a second receiving device configured to receive a positioning assistance data request message sent by a terminal, and the positioning assistance data request message contains first identification information of a beam reference signal detected by the terminal;

a second determining device configured to determine second beam information of a second beam reference signal sent by a neighbouring base station and being detectable by the terminal according to the first identification information, and acquire beam direction information of a beam reference signal containing the second identification information;

a second sending device configured to send positioning assistance data containing the beam direction information of the beam reference signal corresponding to the second identification information to the terminal.

An embodiment of the present application provides a computer readable storage medium that stores a computer program executable by a terminal, where the program causes the terminal to perform the steps of any above-mentioned method applied to the terminal when running on the terminal.

An embodiment of the present application provides a computer readable storage medium that stores a computer program executable by an LMF entity, where the program causes the LMF entity to perform the steps of any above-mentioned method applied to the LMF entity when running on the LMF entity.

An embodiment of the present application provides a positioning system, which includes any above-mentioned electronic device applied to the terminal and any above-mentioned electronic device applied to the LMF entity.

The embodiments of the present application provide a positioning method, device, system, terminal, LMF entity and medium. The method includes: a terminal sends a positioning assistance data request message to an LMF entity, and the positioning assistance data request message contains the first identification information of a beam reference signal detected by the terminal itself; receives the positioning assistance data containing the beam direction information of a beam reference signal corresponding to the second identification information sent by the LMF entity, and the second identification information is the identification information of a beam reference signal sent by a neighboring base station that is determined according to the first identification information and can be detected by the terminal; determines each RSTD of beam reference signals of the first identification information or the second identification information, and determines the location information of the terminal according to each determined RSTD and a beam direction of each beam reference signal. In the embodiments of the present application, the positioning assistance data received by the terminal contains the beam direction information of the beam reference signal, so the terminal can determine its own location information according to each determined RSTD and the beam direction of each beam reference signal, improving the positioning accuracy of the UE-based DL-TDOA.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Embodiments of the present application can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the present application. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In embodiments of the present application, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the present application.

In the existing UE-based DL-TDOA positioning process, the messages exchanged among the UE, LMF entity and BS do not include the information associated with the downlink positioning reference signal beam, so the UE positioning function is not accurate. In order to solve this problem, in the embodiments of the present application, the information associated with the downlink positioning reference signal beam is added to the messages exchanged among the UE, LMF entity and BS, and the information is used to assist the UE in completing the positioning function.

Embodiment 1

Figure 1:
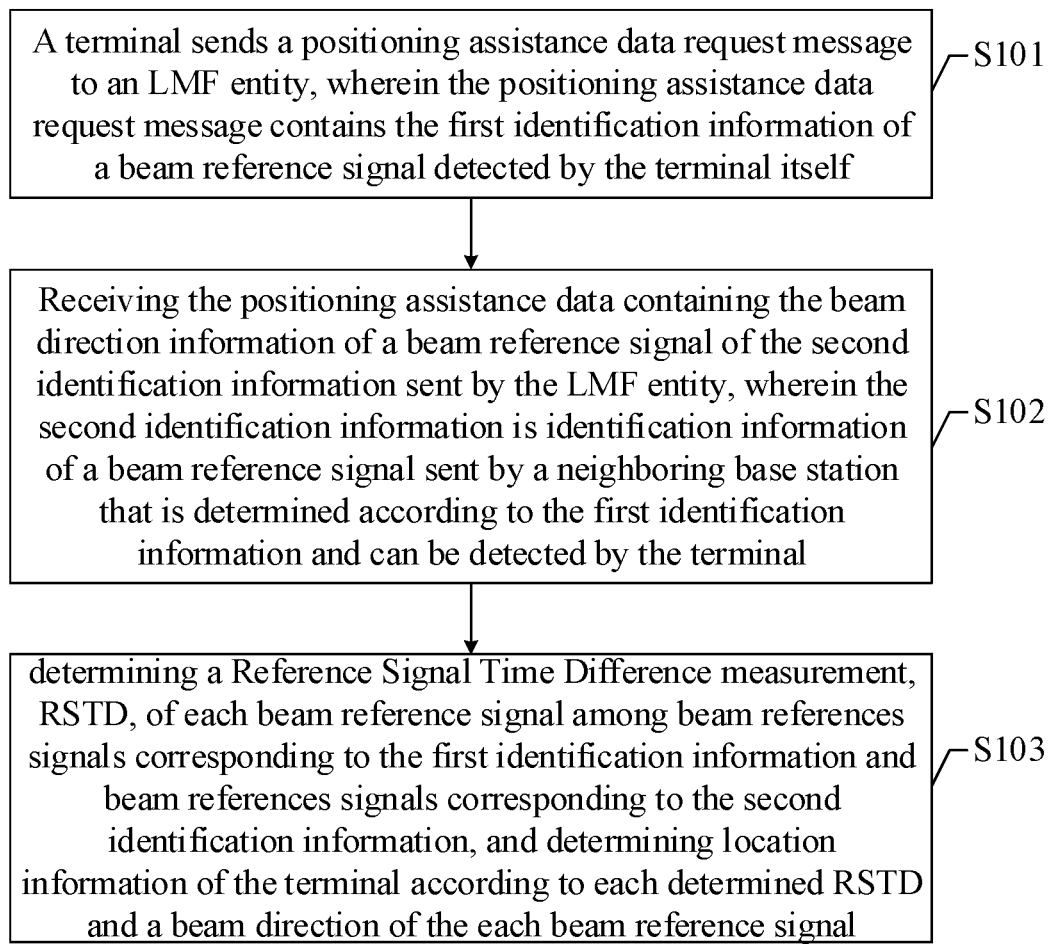
FIG. 1 is a schematic diagram of a process of a positioning method provided in Embodiment 1 of the present application.

FIG. 1 is a schematic diagram of a process of a positioning method provided by an embodiment of the present application, and the process includes the following steps:

S101: a terminal sends a positioning assistance data request message to an LMF entity, and the positioning assistance data request message contains the first identification information of a beam reference signal detected by the terminal itself.

The positioning method provided in the embodiment of the present application is applied to a terminal.

When the terminal needs to start the UE-based DL-TDOA positioning function, it sends a positioning assistance data request message to the LMF entity in order to obtain the positioning assistance data. Since the UE-based DL-TDOA positioning needs to obtain beam reference signals sent by multiple different base stations, the request positioning assistance data message contains the first identification information of the beam reference signal sent by the serving base station of the terminal, so that the LMF entity can determines the beam reference signals sent by other neighboring base stations according to the first identification information.

In one embodiment, since the terminal in the RRC state periodically detects the beam reference signals from the serving base station and neighboring base stations to support Radio resource management (RRM), the RRM can provide the measured values such as the identification information and signal strength of the beam reference signal to the terminal, that is, when the terminal detects a beam reference signal, the RRM can provide the first identification information of the beam reference signal to the terminal.

Here, the beam reference signal may include a DL-RS used to support data communication, or may include a downlink PRS used to support positioning, or may include both of them, which is not limited in the embodiments of the present application. Furthermore, the first identification information may be a beam identifier of the beam reference signal, for example, may be an SSB index detected during the RRM measurement, or the identification information that uniquely identifies the beam reference signal, such as a channel state indication reference signal index.

It should be noted that the positioning assistance data request message sent by the terminal to the LMF entity may further contain other information which is the same as that in the prior art. The details can refer to the information in the message sent by the terminal to the LMF entity in the prior art, and will not be repeated here.

S102: receiving the positioning assistance data containing the beam direction information of a beam reference signal corresponding to the second identification information sent by the LMF entity, and the second identification information is identification information of a beam reference signal sent by a neighboring base station that is determined according to the first identification information and can be detected by the terminal.

After receiving the positioning assistance data request message sent by the terminal, the LMF entity may acquire the first identification information carried in the positioning assistance data request message. The beam reference signal sent by the neighboring base station that can be detected by the terminal is determined according to the first identification information. The specific determination process is the prior art, and will not be repeated in the embodiment of the present application. For example, if the beam reference signal is a DL-RS, the signal strength information of the DL-RS may also be carried in the positioning assistance data request message, and then the LMF entity may determine whether each beam reference signal of the first identification information can cover the terminal by obtaining the signal strength information of the beam reference signal, and determine the beam reference signal that can cover the terminal as the beam reference signal sent by the neighboring base station. There may be one or more beam reference signals.

After the beam reference signal is determined, the second identification information of the beam reference signal is determined, where the second identification information may also be a beam identifier of the beam signal. Then, the LMF entity obtains the beam direction information of the beam reference information of the second identification information according to the second identification information.

The LMF entity sends the positioning assistance data containing the beam direction information of the beam reference signal corresponding to the second identification information to the terminal, and the terminal receives the positioning assistance data and performs the UE-based DL-TDOA positioning.

S103: determining each RSTD of beam reference signals of the first identification information or the second identification information, and determining the location information of the terminal according to each determined RSTD and the beam direction of each beam reference signal.

After receiving the positioning assistance data, the terminal firstly determines the RSTD of each beam reference signal. The specific RSTD measurement process is in the prior art and will not be repeated in the embodiment of the present application. Since the positioning assistance data also contains the beam direction information of the beam reference signal corresponding to the second identification information, the location information of the terminal can be determined according to each determined RSTD and the beam direction of the beam reference signal corresponding to each second identification information.

In some embodiments of the present application, the positioning assistance data received by the terminal contains the beam direction information of the first beam reference signal, so the terminal can determine its own location information according to each determined RSTD and the beam direction of each beam reference signal, improving the positioning accuracy of the UE-based DL-TDOA.

Embodiment 2

In order to ensure the normal operation of the positioning function of the terminal, on the basis of the foregoing embodiments and in an embodiment of the present application, before the terminal sends the positioning assistance data request message to the LMF entity, the method further includes:

receiving a positioning capability request message sent by the LMF entity;

sending a positioning capability provision message to the LMF entity, and the positioning capability provision message contains a positioning capability supported by the terminal.

At present, there are many positioning methods supported by the 3GPP protocol specification, such as UE-assisted DL-TDOA positioning and UE-based DL-TDOA positioning. In order to ensure that the terminal normally uses its own positioning capability to complete positioning, the LMF entity needs to send a positioning capability request message to the terminal to request the terminal to notify the LMF entity of the positioning capability that the terminal can support.

After receiving the positioning capability request message, the terminal determines the positioning capability it can support, carries the supported positioning capability in the positioning capability provision message, and sends it to the LMF entity. For example, if the terminal supports the UE-based DL-TDOA positioning Capability, then the UE-based DL-TDOA positioning capability can be carried in the positioning capability provision message.

On the basis of the foregoing embodiments and in an embodiment of the present application, after determining the location information of the terminal, the method further includes:

sending a positioning information provision message containing the location information of the terminal to the LMF entity.

The UE-based DL-TDOA positioning function of the terminal can be triggered by itself, that is, the terminal actively reports the location information of the terminal determined by itself to the LMF entity. At this time, the terminal can send a positioning information provision message to the LMF entity, and this message carries the location information of the terminal determined by itself according to each RSTD and the beam direction of each beam reference signal.

Of course, the UE-based DL-TDOA positioning function of the terminal can also be triggered by the LMF entity. Specifically, when the LMF entity wants to obtain the location information of a terminal, it can send a positioning information request message to the terminal, so that the terminal can determine its own location information according to each RSTD and the beam direction of each beam reference signal and carry the location information in the location information provision message and send it to the LMF entity.

On the basis of the foregoing embodiment and in an embodiment of the present application, the step of receiving the positioning assistance data containing the beam direction information of the beam reference signal corresponding to the second identification information sent by the LMF entity includes:

the terminal receives the positioning assistance data containing the beam direction information of the beam reference signal corresponding to the second identification information sent by the LMF entity and forwarded by a base station that provides services for the terminal.

When receiving the positioning assistance data, the terminal can directly receive the data sent by the LMF entity or can receive the data forwarded by the serving base station.

In one embodiment, the LMF entity firstly sends the positioning assistance data to the serving base station that provides services for the terminal, and then the serving base station forwards it to the terminal.

In an embodiment of the present application, the terminal sends a positioning capability provision message to the LMF entity to prompt the positioning capability supported by the LMF entity itself, completing the entire terminal positioning process reliably.

Embodiment 3

In order to make the terminal positioning more accurate, on the basis of the foregoing embodiments and in an embodiment of the present application, the step of determining the location information of the terminal according to each determined RSTD and the beam direction of each beam reference signal includes:

determining the first reference location information of the terminal according to each RSTD and a preset RSTD positioning algorithm;

determining an AOA at which a base station that sends a beam reference signal corresponding to each second identification information arrives at the terminal according to a beam direction of the beam reference signal corresponding to the second identification information, and determining the second reference location information of the terminal based on a preset AOA positioning algorithm;

determining the location information of the terminal according to preset weight values corresponding to the first reference location information and second reference location information as well as the first reference location information and second reference location information.

In order to make the location information of the terminal obtained by the UE-based DL-TDOA more accurate, in an embodiment of the present application, the terminal positioning process is specifically described as follows.

When determining the location information of the terminal according to each determined RSTD and the beam direction of the beam reference signal corresponding to each second identification information, it is possible to firstly determine the first reference location information according to each RSTD by using a preset RSTD positioning algorithm; and determine an Angle Of Arrival (AOA) at which the base station that sends the beam reference signal corresponding to each second identification information arrives at the terminal according to the beam direction of the beam reference signal corresponding to each second identification information, and determine the second reference location information according to the determined AOA corresponding to the beam reference direction of each second identification information. In order to make the obtained location information of the terminal more accurate, different weight values can be assigned to the location information of the terminal obtained by the RSTD positioning algorithm and the location information of the terminal obtained by the AOA positioning algorithm in advance. After the first reference location information and the second reference location information are determined, the final location information of the terminal is obtained in the weighting and merging way.

On the basis of the foregoing embodiments and in an embodiment of the present application, the step of determining the location information of the terminal according to each determined RSTD and the beam direction of each beam reference signal includes.

determining an AOA at which a base station that sends a beam reference signal corresponding to each second identification information arrives at the terminal according to the beam direction of the beam reference signal corresponding to the second identification information;

determining the location information of the terminal by using a joint positioning algorithm of preset RSTD timing parameters and AOA angle parameters according to each RSTD and each AOA.

When determining the location information of the terminal according to each determined RSTD and the beam direction of the beam reference signal corresponding to each second identification information, it is also possible to determine each RSTD and each AOA respectively by using the above-mentioned method, and then calculate the final location information of the terminal by using a preset joint positioning algorithm of the RSTD timing parameter and AOA angle parameter according to each RSTD and each AOA.

In the embodiment of the present application, the location information of the terminal is determined according to each obtained RSTD and the beam direction of the beam reference signal corresponding to each second identification information by using the preset positioning algorithm, improving the positioning accuracy of the terminal.

Embodiment 4

Figure 2:
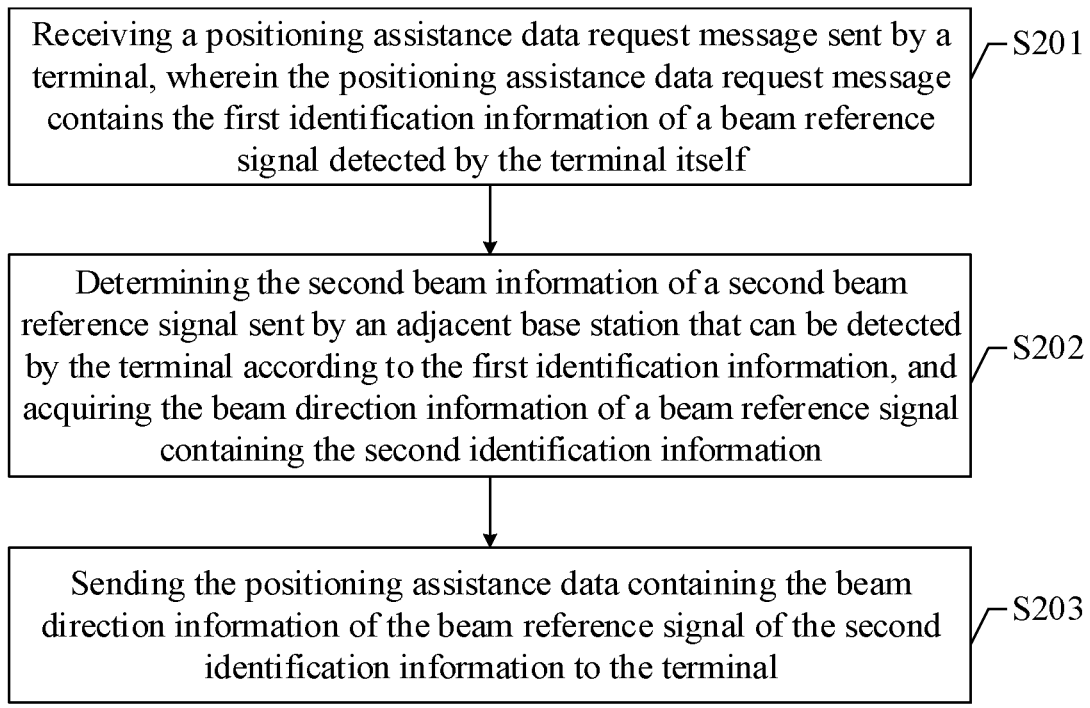
FIG. 2 is a schematic diagram of a process of a positioning method provided in Embodiment 3 of the present application.

FIG. 2 is a schematic diagram of a process of a positioning method provided by the embodiment of the present application, and the process includes the following steps:

S201: receiving a positioning assistance data request message sent by a terminal, and the positioning assistance data request message contains the first identification information of a beam reference signal detected by the terminal itself.

The positioning method provided in the embodiment of the present application is applied to an LMF entity.

When a terminal needs to start the UE-based DL-TDOA positioning function, the terminal sends a positioning assistance data request message to the LMF entity in order to obtain the positioning assistance data. Since the UE-based DL-TDOA positioning needs to measure beam reference signals sent by multiple different base stations, in order for the LMF entity to determine the beam reference signals of a neighboring base station that the terminal can detect, the positioning assistance data request message contains the first identification information of the first beam reference signal, and the beam reference signal is sent by the serving base station of the terminal.

The LMF entity receives the positioning assistance data request message, and obtains the first identification information of the beam reference signal sent by the serving base station that is carried in the positioning assistance data request message and detected by the terminal itself, and the beam reference signal may include a DL-RS used to support data communication, or may include a downlink PRS used to support positioning, or may include both of them. Furthermore, the first identification information may be a beam identifier of the beam reference signal, etc. For example, if the beam reference signal is a downlink PRS, the first identification information may be the beam identification information of the PRS.

S202: determining the second beam information of a second beam reference signal sent by an adjacent base station that can be detected by the terminal according to the first identification information, and acquiring the beam direction information of a beam reference signal containing the second identification information.

After the LMF entity acquires the first identification information of the beam reference signal sent by the serving base station, the UE-based DL-TDOA positioning needs to measure the beam reference signals sent by multiple different base stations, so the second identification information of the beam reference signal sent by the neighboring base station that the terminal can detect according to the first identification information. The specific determination process is the prior art, and will not be repeated in the embodiment of the present application. In order to improve the positioning accuracy of the terminal, in an embodiment of the present application, the LMF entity also needs to acquire the beam direction information of the beam reference signal corresponding to the second identification information, and the beam direction information is specifically the direction information of the beam reference signal sent by the base station.

S203: sending the positioning assistance data containing the beam direction information of the beam reference signal corresponding to the second identification information to the terminal.

In order to improve the positioning accuracy of the terminal, the LMF entity sends the positioning assistance data containing the beam direction information of the beam reference signal corresponding to the second identification information to the terminal. Thus, the terminal determines each RSTD of beam reference signals of the first identification information or the second identification information, and determines the location information of the terminal according to each determined RSTD and the beam direction of each beam reference signal.

It should be noted that the positioning assistance data may also contain other information that is the same as in the prior art, which will not be repeated here.

In the embodiment of the present application, the terminal can determine the location information of the terminal according to the beam direction information of the downlink positioning reference signal by acquiring the beam direction information of the beam reference signal corresponding to the second identification information and sending the beam direction information to the terminal, improving the positioning accuracy of the terminal.

Embodiment 5

In order to ensure that the accurate positioning assistance data can be provided to the terminal, on the basis of the foregoing embodiments and in an embodiment of the present application, before receiving the positioning assistance data request message sent by the terminal, the method further includes:

sending a positioning capability request message to the terminal when detecting that the terminal is in the RRC state;

receiving a positioning capability provision message containing a positioning capability supported by the terminal sent by the terminal.

In order to ensure that the terminal can be provided with the accurate positioning assistance data when the terminal is positioned, if it is detected that the terminal is in the RRC state before the positioning assistance data request message sent by the terminal is received, the LMF entity sends a positioning capability request message to the terminal to request the terminal to notify the LMF entity of the positioning capability supported by the terminal.

After receiving the positioning capability request message, the terminal determines the positioning capability supported by itself, carries the supported positioning capability in the positioning capability provision message, and sends it to the LMF entity. For example, if the terminal supports the UE-based DL-TDOA positioning Capability, then the UE-based DL-TDOA positioning capability can be carried in the positioning capability provision message.

The LMF entity receives the positioning capability information, determines the positioning capability of the terminal, and thus can continue to provide the required data to the terminal.

Embodiment 6

In order to ensure that the positioning assistance data can be sent to the corresponding terminal, on the basis of the foregoing embodiments and in an embodiment of the present application, the step of sending the positioning assistance data containing the beam direction information of the beam reference signal corresponding to the second identification information to the terminal includes:

the LMF entity sends the positioning assistance data containing the beam direction information of the beam reference signal corresponding to the second identification information to a base station serving the terminal, so that the base station forwards the positioning assistance information to the terminal.

Based on the foregoing content, after determining the positioning assistance data containing the beam direction information of the beam reference signal corresponding to the second identification information, the LMF entity sends the positioning assistance data to the terminal in order to ensure that the terminal can be accurately positioned. In one embodiment, the LMF entity may directly send the positioning assistance data to the terminal.

Since one LMF entity can provide the positioning assistance data for multiple terminals, the LMF entity can also send the positioning assistance data of the terminals belonging to a same serving base station to the serving base station and the serving base station forwards it to the corresponding terminal in the case of a large number of terminals. In one embodiment, since the positioning assistance data corresponding to each terminal is different, the LMF entity can also carry the identification information of the terminal (e.g., the identification information that uniquely identifies the terminal, such as IMSI) to which the positioning assistance data belongs when sending the positioning assistance data to the serving base station. After receiving the positioning assistance data, the serving base station may forward the positioning assistance data to the corresponding terminal according to the terminal identification information carried in the positioning assistance data.

In some embodiments of the present application, the LMF entity sends the positioning assistance data to the serving base station, and the serving base station forwards the positioning assistance data to the terminal, so that the positioning assistance data can be accurately sent to the terminal in different ways.

Embodiment 7

In order to provide the accurate positioning assistance data for the terminal, on the basis of the foregoing embodiments and in an embodiment of the present application, the step of acquiring the beam direction information of the beam reference signal containing the second identification information includes:

the LMF entity sends a DL-TDOA information request message containing the second identification information to each base station in an NR system;

receiving a DL-TDOA information response message sent by each base station, and the DL-TDOA information response message contains the beam direction information of the beam reference signal corresponding to the second identification information.

In order to provide the accurate positioning assistance data to the terminal to enable the terminal to complete the accurate positioning, the LMF entity needs to acquire the beam direction information of the beam reference signal in an embodiment of the present application. Since the UE-based DL-TDOA positioning needs to obtain beam reference signals sent by multiple different base stations, the LMF entity needs to send an DL-TDOA information request message containing the second identification information to each base station in the NR system, so that each base station can determine the corresponding beam reference signal according to the second identification information, then determine the beam direction information of each beam reference signal, carry the beam direction information in the DL-TDOA information response message and send it to the LMF entity. The LMF entity receives the beam direction information of the beam reference signal corresponding to the second identification information sent by each base station.

It should be noted that the base station can also acquire other data, such as the physical ID of the base station, the antenna position of the base station and other parameters, the clock calibration parameters of the base station, PRS configuration data, etc., mentioned in the prior art in addition to acquiring the beam direction information of the beam reference signal corresponding to the second identification information when receiving the DL-TDOA information request message, which will not be repeated here. The base station may carry the data in the DL-TDOA information response message and send it to the LMF entity.

After receiving the DL-TDOA information response message, the LMF entity acquires the data in the DL-TDOA information response message, such as the beam direction information of the beam reference signal corresponding to the second identification information, the physical ID of the base station, the antenna position of the base station, etc., to form the positioning assistance data, and sends the positioning assistance data to the terminal. The positioning assistance data may include the PRS beam identification information, PRS beam direction information, DL-RS beam identifier and DL-RS beam direction information of the beam reference signal. In addition, if the beam reference signal is a DL-RS, the positioning assistance data also includes the QCL association relationship between the DL-RS beam and the PRS beam in order to obtain the support of positioning the downlink PRS.

In some embodiments of the present application, the LMF entity acquires the beam direction information of the beam reference signal corresponding to the second identification information by sending the DL-TDOA information request message to the base station, providing the accurate positioning assistance data for the terminal and ensuring the positioning accuracy of the terminal.

Figure 3:
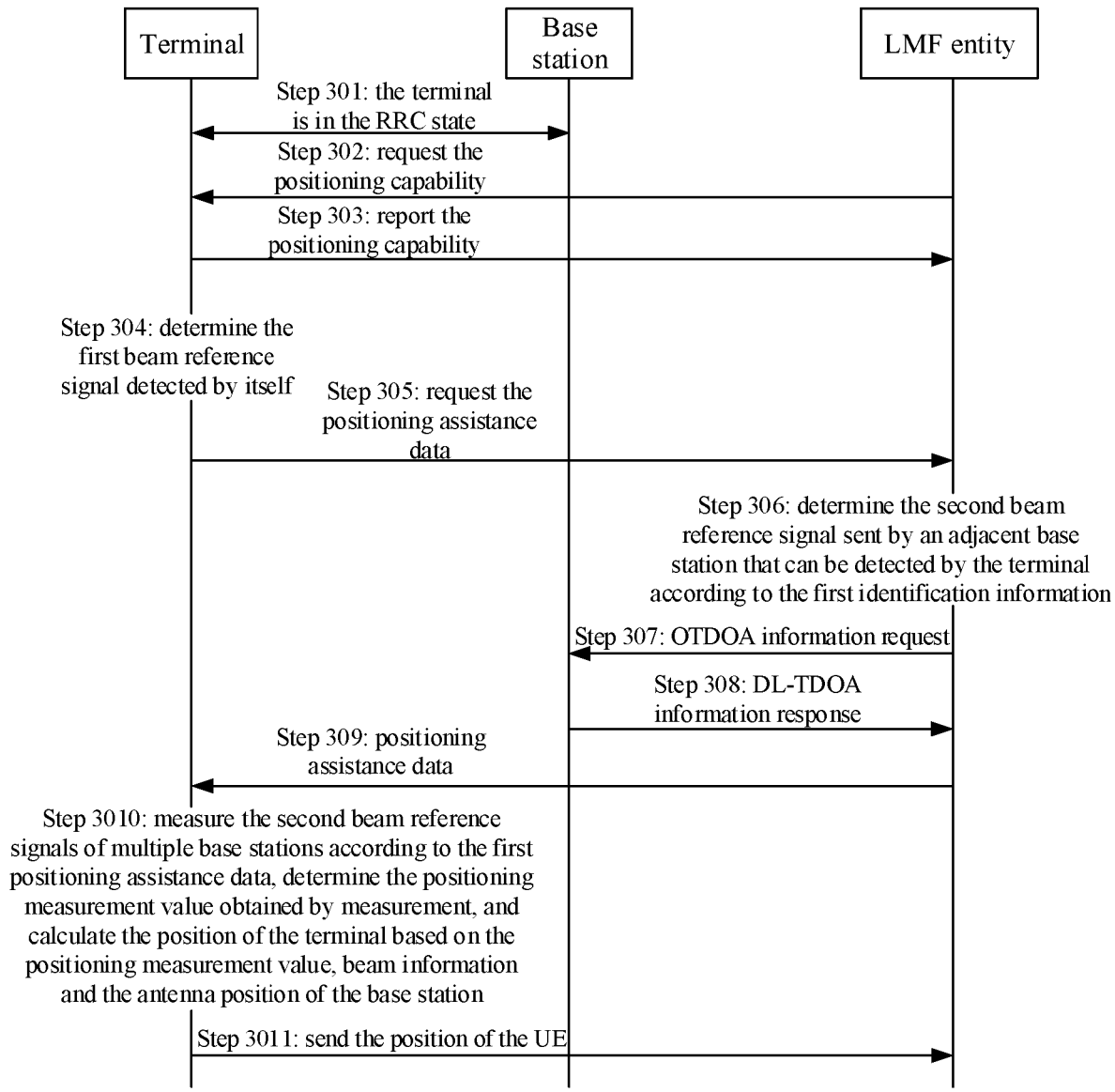
FIG. 3 is a schematic diagram of a specific process of a positioning method provided by an embodiment of the present application.

The above embodiments are described in detail below with a specific embodiment, as shown in FIG. 3, which includes the following steps:

Step 301: a UE is in the RRC state after the UE establishes a connection with a BS; Step 302: an LMF entity sends a "positioning capability request" message to the UE to request the UE to notify the LMF entity of the positioning capability supported by the UE;

Step 303: the UE sends a "positioning capability provision" message to respond to the LMF entity, where the "positioning capability provision" message contains the positioning capability of the NG-RAN DL-TDOA supported by the UE;

Step 304: the UE determines the beam reference signal detected by itself, where the beam reference signal may be a DL-RS or a downlink PRS.

In addition, after the UE determines the beam reference signal detected by itself, it also needs to determine the first identification information by way of using the RRM to measure the beam reference signal. The first identification information may be the beam identification of the beam reference signal, and the beam reference signal of the first identification signal is sent by the serving base station of the terminal.

Step 305: the UE sends a "positioning assistance data request" message to the LMF entity when the terminal needs the downlink positioning assistance data, where the message includes the first identification information of the beam reference signal.

The existing "positioning assistance data request" message will need to be modified. In addition to the information contained in the current protocol, such as the physical cell ID, the antenna position of the base station and the PRS configuration data, the information associated with the downlink reference signal (DL-RS/PRS) beam detected by the UE, such as DL-RS beam identifier, DL-RS signal strength, PRS beam identifier, etc., is also added.

Step 306: the LMF entity determines the second identification information of the beam reference signal sent by an adjacent base station that can be detected by the terminal according to the first identification information.

Step 307: the LMF entity sends a "DL-TDOA information request" message to the BS, where this message request carries the second identification information.

After receiving the DL-TDOA information request message, the BS determines the beam direction information of the beam reference signal corresponding to the second identification information according to the second identification information.

Step 308: the BS sends a "DL-TDOA information response" message to the LMF entity and provides the requested positioning assistance data, such as the beam direction information of the beam reference signal, to the LMF entity.

The existing "DL-TDOA information response" message needs to be modified. In addition to the information contained in the current protocol, this message also adds the information associated with the downlink reference signal (DL-RS/PRS) beam of the BS, for example: the beam identifier, beam direction and beam width of the PRS; the beam identifier, beam direction and beam width of the DL-RS; the QCL association relationship between DL-RS beam and PRS beam, etc.

Figure 4:
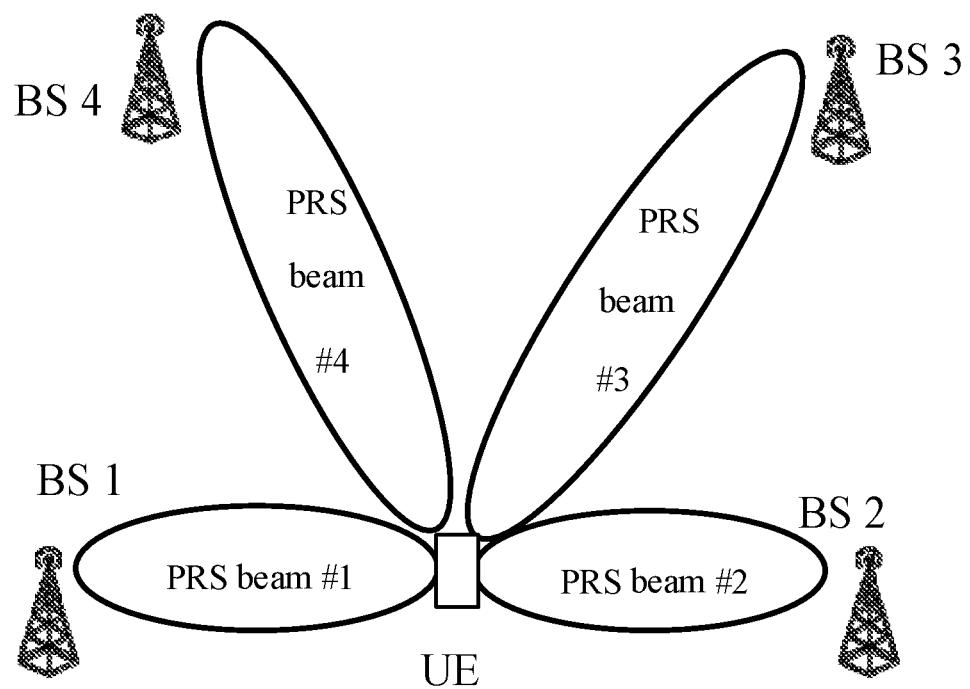
FIG. 4 is a schematic diagram of determining the location information of a terminal according to the beam direction information of a beam reference signal provided by an embodiment of the present application.

As shown in FIG. 4, it is a schematic diagram of determining the location information of the terminal according to the beam direction information of the beam reference signal. Here, if the UE can detect the PRS beams #1, #2, #3 and #4 from the BS1, BS2, BS3 and BS4, then the UE can determine the overlapping area of the beams according to the beam directions of the beams #1, #2, #3 and #4, and then this area is the position of the UE.

Furthermore, the RRM measurement result can provide the UE with the beam reference signals of the serving base station and neighboring base stations that can be detected as well as the signal strengths of the beam reference signals. If the UE provides the LMF entity with the beam reference signals of the serving base station and neighboring base stations that can be detected by the UE as well as the signal strengths of the beam reference signals, and the base station also provides the LMF entity with the beam direction information of the beam reference signals, then the LMF entity can determine the downlink PRS that is most likely to be detected by the UE by using these information, and thus only the relevant information such as the beam direction of this PRS can be sent when the positioning assistance information is sent, improving the positioning efficiency of the UE.

Step 309: the LMF entity provides the requested positioning assistance data to the UE.

The existing "positioning assistance data" needs to be modified. In addition to the information contained in the current protocol, the information related to the beam identifier, such as beam direction information, is also added.

Step 3010: the UE obtains the positioning measurement value RSTD, and determines the location information of the terminal according to each determined RSTD and the beam direction of each beam reference signal.

Step 3011, the UE sends a "positioning information provision" message to the LMF entity, where the message includes the location information of the UE.

Figure 5:
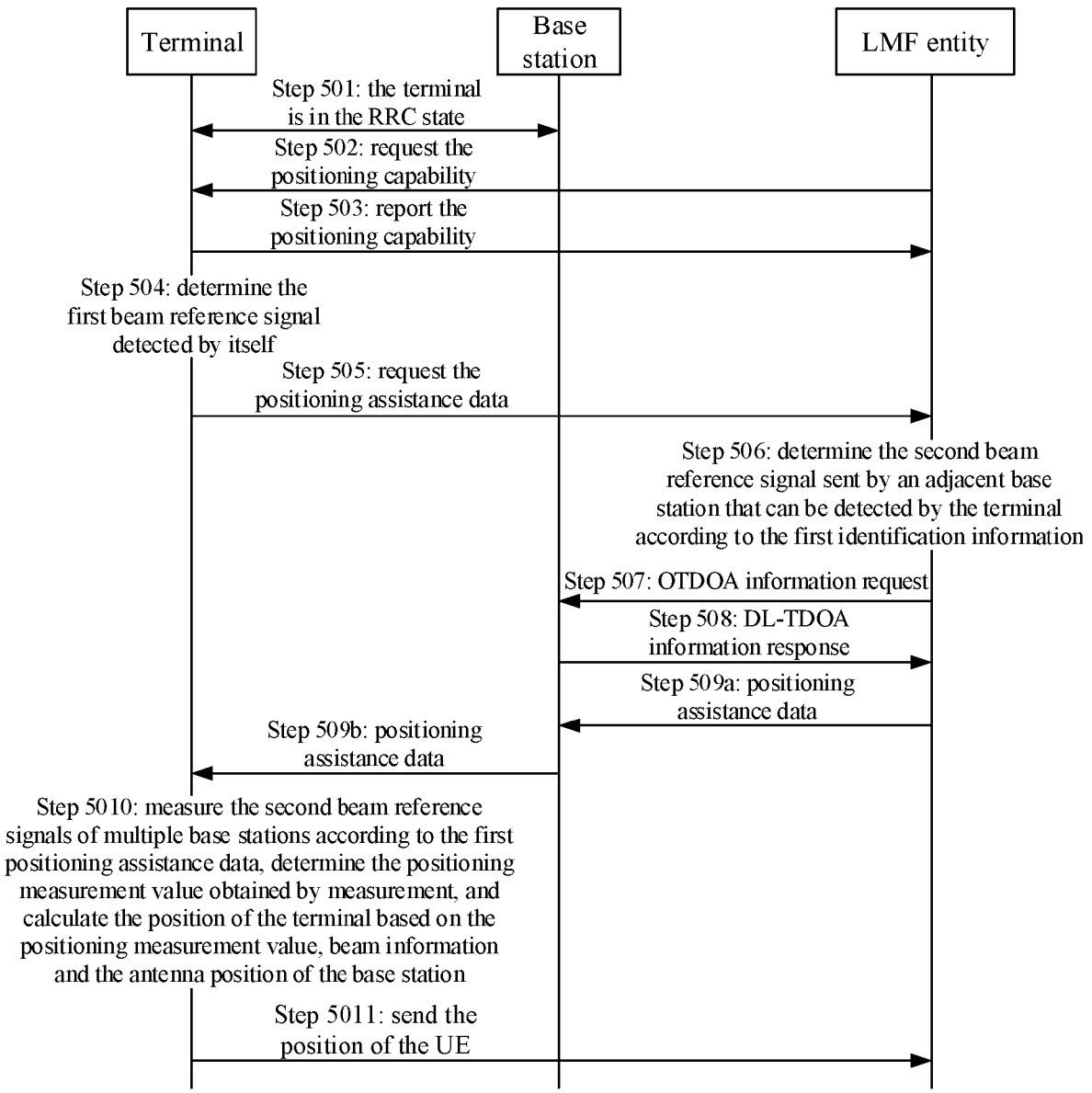
FIG. 5 is a schematic diagram of a specific process of a positioning method provided by an embodiment of the present application.

Furthermore, the positioning method shown in FIG. 5 can also be used for positioning the terminal, and steps 501 to 508 are the same as steps 301 to 308 in FIG. 3, and steps 5010 to 5011 are the same as steps 3010 to 3011 in FIG. 3. That is, the step 309 in FIG. 3 is modified as the following steps:

Step 509a: the LMF entity firstly sends the "positioning assistance data" to the serving base station of the UE;

Step 509b: the serving base station forwards the "positioning assistance data" to the UE.

The LMF entity sends the "positioning assistance data" to the serving base station of the UE, and the serving base station forwards it to the UE, so that the LMF entity is not required to send the positioning assistance data to the UEs one by one in the case of a large number of UEs.

Embodiment 8

Figure 6:
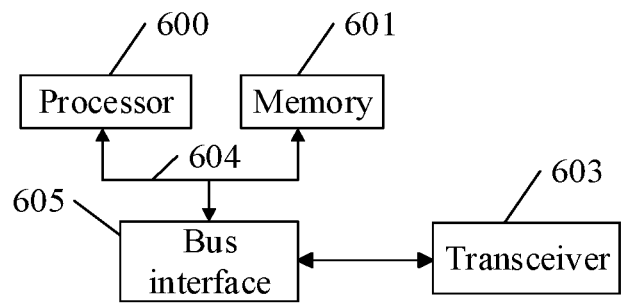
FIG. 6 is a structural schematic diagram of a terminal provided by an embodiment of the present application.

FIG. 6 is a terminal provided by the embodiment of the present application, where the terminal includes a processor 600, a memory 601, a transceiver 602 and a bus interface.

The processor 600 is responsible for managing the bus architecture and general processing, and the memory 601 may store the data used by the processor 600 when performing the operations. The transceiver 603 is configured to receive and send the data under the control of the processor 600.

The bus architecture may include any numbers of interconnected buses and bridges, and specifically link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by some embodiments of the present application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in some embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

In one embodiment, the processor 600 is configured to read the program in the memory 601 and perform followings:

sending a positioning assistance data request message to an LMF entity, and the positioning assistance data request message contains the first identification information of a beam reference signal detected by the terminal itself;

receiving the positioning assistance data containing the beam direction information of a beam reference signal corresponding to the second identification information sent by the LMF entity, and the second identification information is the identification information of a beam reference signal sent by a neighboring base station that is determined according to the first identification information and can be detected by the terminal;

determining a Reference Signal Time Difference measurement, RSTD, of each beam reference signal among beam references signals corresponding to the first identification information and beam references signals corresponding to the second identification information, and determining location information of the terminal according to each determined RSTD and a beam direction of the each beam reference signal.

Further, the processor 600 is further configured to: receive a positioning capability request message sent by the LMF entity before the terminal sends the positioning assistance data request message to the LMF entity; and send a positioning capability provision message to the LMF entity, and the positioning capability provision message contains a positioning capability supported by the terminal.

Further, the processor 600 is configured to: receive the positioning assistance data containing the beam direction information of the beam reference signal corresponding to the second identification information sent by the LMF entity and forwarded by a base station that provides services for the terminal.

Further, the processor 600 is configured to: determine first reference location information of the terminal according to each RSTD and a preset RSTD positioning algorithm; determine an AOA at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and second reference location information.

Further, the processor 600 is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

Further, the processor 600 is further configured to: send a positioning information provision message containing the location information of the terminal to the LMF entity after determining the location information of the terminal.

Embodiment 9

Figure 7:
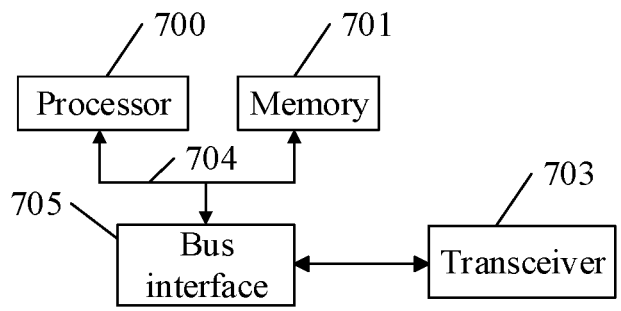
FIG. 7 is a structural schematic diagram of an LMF entity provided by an embodiment of the present application.

FIG. 7 is an LMF entity provided by the embodiment of the present application, where the LMF entity includes: a processor 700, a memory 701 and a transceiver 703.

The processor 700 is responsible for managing the bus architecture and general processing, and the memory 701 may store the data used by the processor 700 when performing the operations. The transceiver 703 is configured to receive and send the data under the control of the processor 700.

The bus architecture may include any numbers of interconnected buses and bridges, and specifically link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by some embodiments of the present application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in some embodiments of the present application. The general-purpose processor may be a microprocessor or any conventional processor or the like. The steps of the method disclosed in combination with some embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with its hardware.

In one embodiment, the processor 700 is configured to read the program in the memory 701 and perform followings:

receiving a positioning assistance data request message sent by a terminal, and the positioning assistance data request message contains the first identification information of a beam reference signal detected by the terminal itself;

determining the second beam information of a second beam reference signal sent by an adjacent base station that can be detected by the terminal according to the first identification information, and acquiring the beam direction information of a beam reference signal containing the second identification information;

sending the positioning assistance data containing the beam direction information of the beam reference signal corresponding to the second identification information to the terminal.

Further, the processor 700 is further configured to: before receiving the positioning assistance data request message sent by the terminal, send a positioning capability request message to the terminal when detecting that the terminal is in the RRC state; and receive a positioning capability provision message containing a positioning capability supported by the terminal sent by the terminal.

Further, the processor 700 is configured to: send the positioning assistance data containing the beam direction information of the beam reference signal corresponding to the second identification information to a base station serving the terminal, so that the base station forwards the positioning assistance information to the terminal.

Further, the processor 700 is further configured to: send a DL-TDOA information request message containing the second identification information to each base station in an NR system; and receive a DL-TDOA information response message sent by each base station, and the DL-TDOA information response message contains the beam direction information of the beam reference signal corresponding to the second identification information.

Embodiment 10

Figure 8:
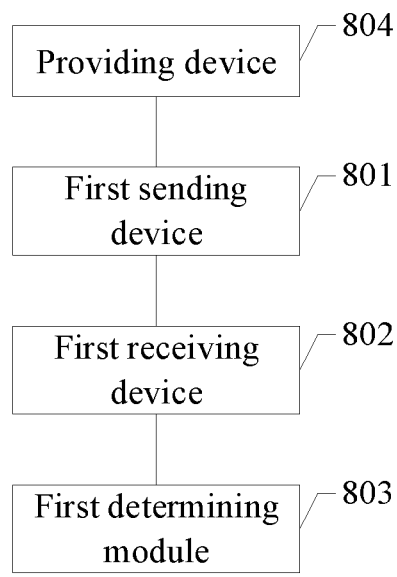
FIG. 8 is a structural schematic diagram of a positioning device provided in Embodiment 10 of the present application.

An embodiment of the present application provides a positioning device applied to a terminal. The device provided by the embodiment of the present application is shown in FIG. 8, and the device includes:

a first sending device 801 configured to send a positioning assistance data request message to an LMF entity, and the positioning assistance data request message contains the first identification information of a beam reference signal detected by the terminal itself;

a first receiving device 802 configured to receive the positioning assistance data containing the beam direction information of a beam reference signal corresponding to the second identification information sent by the LMF entity, and the second identification information is identification information of a beam reference signal sent by a neighboring base station that is determined according to the first identification information and can be detected by the terminal;

a first determining device 803 configured to determine a Reference Signal Time Difference measurement, RSTD, of each beam reference signal among beam references signals corresponding to the first identification information and beam references signals corresponding to the second identification information, and determine location information of the terminal according to each determined RSTD and a beam direction of the each beam reference signal.

Further, the device further includes a providing device 804 configured to: receive a positioning capability request message sent by the LMF entity; and send a positioning capability provision message to the LMF entity, and the positioning capability provision message contains a positioning capability supported by the terminal.

Further, the first receiving device 802 is configured to: receive the positioning assistance data containing the beam direction information of the beam reference signal corresponding to the second identification information sent by the LMF entity and forwarded by a base station that provides services for the terminal.

Further, the first determining device 803 is configured to: determine first reference location information of the terminal according to each RSTD and a preset RSTD positioning algorithm; determine an AOA at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and second reference location information.

Further, the first determining device 803 is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

Further, the first sending device 801 is further configured to send a positioning information provision message containing the location information of the terminal to the LMF entity.

Embodiment 11

Figure 9:
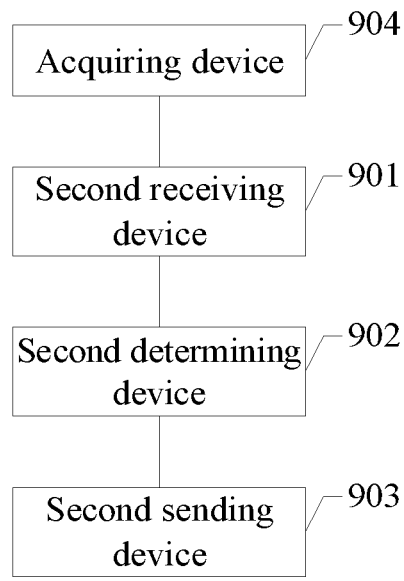
FIG. 9 is a structural schematic diagram of a positioning device provided in Embodiment 11 of the present application.

Based on an embodiment of the present application provides a positioning device applied to an LMF entity. The device provided by the embodiment of the present application is shown in FIG. 9, and the device includes:

a second receiving device 901 configured to receive a positioning assistance data request message sent by a terminal, and the positioning assistance data request message contains the first identification information of a beam reference signal detected by the terminal itself;

a second determining device 902 configured to determine the second beam information of a second beam reference signal sent by an adjacent base station that can be detected by the terminal according to the first identification information, and acquire the beam direction information of a beam reference signal containing the second identification information;

a second sending device 903 configured to send the positioning assistance data containing the beam direction information of the beam reference signal corresponding to the second identification information to the terminal.

Further, the device further includes an acquiring device 904 configured to: send a positioning capability request message to the terminal when detecting that the terminal is in the RRC state; and receive a positioning capability provision message containing a positioning capability supported by the terminal sent by the terminal.

Further, the second sending device 903 is configured to: send the positioning assistance data containing the beam direction information of the beam reference signal corresponding to the second identification information to a base station serving the terminal, so that the base station forwards the positioning assistance information to the terminal.

Further, the second determination device 902 is configured to: send a DL-TDOA information request message containing the second identification information to each base station in an NR system; and receive a DL-TDOA information response message sent by each base station, and the DL-TDOA information response message contains the beam direction information of the beam reference signal corresponding to the second identification information.

Embodiment 12

Figure 10:
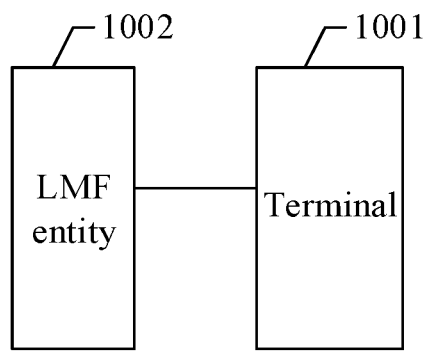
FIG. 10 is a structural schematic diagram of a positioning system provided by an embodiment of the present application.

FIG. 10 is a structural schematic diagram of a paging system provided by the embodiment of the present application. The paging system includes a terminal 1001 and an LMF entity 1002.

The terminal 1001 is configured to: send a positioning assistance data request message to the LMF entity, and the positioning assistance data request message contains the first identification information of a beam reference signal detected by the terminal itself; receive the positioning assistance data containing the beam direction information of a beam reference signal corresponding to the second identification information sent by the LMF entity, and the second identification information is the identification information of a beam reference signal sent by a neighboring base station that is determined according to the first identification information and can be detected by the terminal; determine each RSTD of beam reference signals of the first identification information or the second identification information, and determine the location information of the terminal according to each determined RSTD and a beam direction of each beam reference signal.

The LMF entity 1002 is configured to: receive a positioning assistance data request message sent by the terminal, and the positioning assistance data request message contains the first identification information of a beam reference signal detected by the terminal itself; determine the second beam information of a second beam reference signal sent by an adjacent base station that can be detected by the terminal according to the first identification information, and acquire the beam direction information of a beam reference signal containing the second identification information; and send the positioning assistance data containing the beam direction information of the beam reference signal corresponding to the second identification information to the terminal.

In order to solve the problem of low positioning accuracy of the UE-based DL-TDOA in the prior art, an embodiment of the present application provides a positioning system.

The terminal 1001 is further configured to: receive a positioning capability request message sent by the LMF entity before the terminal sends the positioning assistance data request message to the LMF entity; and send a positioning capability provision message to the LMF entity, and the positioning capability provision message contains a positioning capability supported by the terminal.

The terminal 1001 is configured to: receive the positioning assistance data containing the beam direction information of the beam reference signal corresponding to the second identification information sent by the LMF entity and forwarded by a base station that provides services for the terminal.

The terminal 1001 is configured to: determine first reference location information of the terminal according to each RSTD and a preset RSTD positioning algorithm; determine an AOA at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and second reference location information.

The terminal 1001 is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

The terminal 1001 is further configured to: send a positioning information provision message containing the location information of the terminal to the LMF entity after determining the location information of the terminal.

The LMF entity 1002 is further configured to: before receiving the positioning assistance data request message sent by the terminal, send a positioning capability request message to the terminal when detecting that the terminal is in the RRC state; and receive a positioning capability provision message containing a positioning capability supported by the terminal sent by the terminal.

The LMF entity 1002 is configured to: send the positioning assistance data containing the beam direction information of the beam reference signal corresponding to the second identification information to a base station serving the terminal, so that the base station forwards the positioning assistance information to the terminal.

The LMF entity 1002 is configured to: send a DL-TDOA information request message containing the second identification information to each base station in an NR system; and receive a DL-TDOA information response message sent by each base station, and the DL-TDOA information response message contains the beam direction information of the beam reference signal corresponding to the second identification information.

Embodiment 13

On the basis of the above-mentioned embodiments, the embodiment of the present application further provides a computer readable storage medium that stores a computer program that can be executed by an electronic device. When running on the electronic device, the program causes the electronic device to perform the following steps.

The memory stores a computer program, and when the program is executed by the processor, the processor performs the following steps:

sending a positioning assistance data request message to an LMF entity, and the positioning assistance data request message contains the first identification information of a beam reference signal detected by the terminal itself;

receiving the positioning assistance data containing beam direction information of a beam reference signal corresponding to the second identification information sent by the LMF entity, and the second identification information is the identification information of a beam reference signal sent by a neighboring base station that is determined according to the first identification information and can be detected by the terminal;

determining a Reference Signal Time Difference measurement, RSTD, of each beam reference signal among beam references signals corresponding to the first identification information and beam references signals corresponding to the second identification information, and determining location information of the terminal according to each determined RSTD and a beam direction of the each beam reference signal.

Further, the processor is further configured to: receive a positioning capability request message sent by the LMF entity before the terminal sends the positioning assistance data request message to the LMF entity; and send a positioning capability provision message to the LMF entity, and the positioning capability provision message contains a positioning capability supported by the terminal.

Further, the processor is configured to: receive the positioning assistance data containing the beam direction information of the beam reference signal corresponding to the second identification information sent by the LMF entity and forwarded by a base station that provides services for the terminal.

Further, the processor is configured to: determine first reference location information of the terminal according to each RSTD and a preset RSTD positioning algorithm; determine an AOA at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and second reference location information.

Further, the processor is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

Further, the processor is further configured to: send a positioning information provision message containing the location information of the terminal to the LMF entity after determining the location information of the terminal.

The above-mentioned computer readable storage medium may be any available media or data storage device accessible to a processor in an electronic device, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

Embodiment 14

On the basis of the above-mentioned embodiments, an embodiment of the present application further provides a computer readable storage medium that stores a computer program that can be executed by an electronic device. When running on the electronic device, the program causes the electronic device to perform the following steps.

The memory stores a computer program, and when the program is executed by the processor, the processor performs the following steps:

receiving a positioning assistance data request message sent by a terminal, and the positioning assistance data request message contains the first identification information of a beam reference signal detected by the terminal itself;

determining the second beam information of a second beam reference signal sent by an adjacent base station that can be detected by the terminal according to the first identification information, and acquiring the beam direction information of a beam reference signal containing the second identification information;

sending the positioning assistance data containing the beam direction information of the beam reference signal corresponding to the second identification information to the terminal.

Further, the processor is further configured to: before receiving the positioning assistance data request message sent by the terminal, send a positioning capability request message to the terminal when detecting that the terminal is in the RRC state; and receive a positioning capability provision message containing a positioning capability supported by the terminal sent by the terminal.

Further, the processor is configured to: send the positioning assistance data containing the beam direction information of the beam reference signal corresponding to the second identification information to a base station serving the terminal, so that the base station forwards the positioning assistance information to the terminal.

Further, the processor is further configured to: send a DL-TDOA information request message containing the second identification information to each base station in an NR system; and receive a DL-TDOA information response message sent by each base station, and the DL-TDOA information response message contains the beam direction information of the beam reference signal corresponding to the second identification information.

The above-mentioned computer readable storage medium may be any available media or data storage device accessible to a processor in an electronic device, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

For the system/apparatus embodiments, they are substantially similar to the method embodiments, so the description thereof is relatively simple, and the related parts may refer to the partial illustration of the method embodiments.

It should be noted that the relational terms such as first and second herein are only used to distinguish one entity or operation from another and do not necessarily require or imply any such actual relationship or sequence between these entities or operations.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A positioning method, comprises:
    sending, by a terminal, a positioning assistance data request message to a Location Management Function, LMF, entity, wherein the positioning assistance data request message contains first identification information of a beam reference signal detected by the terminal;

receiving positioning assistance data containing beam direction information of a beam reference signal of second identification information sent by the LMF entity, wherein the second identification information is identification information of a beam reference signal sent by a neighboring base station, and is determined according to the first identification information and is detectable by the terminal;

determining a Reference Signal Time Difference measurement, RSTD, of each beam reference signal among beam references signals corresponding to the first identification information and beam references signals corresponding to the second identification information, and determining location information of the terminal according to each determined RSTD and a beam direction of the each beam reference signal.

2. The positioning method of claim 1, wherein the beam reference signal is a Downlink Reference Signal, DL-RS, and/or a downlink Positioning Reference Signal, PRS;

wherein in response to the beam reference signal being a DL-RS, the positioning assistance data request message further comprises signal strength information of the DL-RS.

3. The positioning method of claim 1, wherein before the sending, by the terminal the positioning assistance data request message to the LMF entity, the method further comprises:

receiving a positioning capability request message sent by the LMF entity;

sending a positioning capability provision message to the LMF entity, wherein the positioning capability provision message contains a positioning capability supported by the terminal.

4. The positioning method of claim 1, wherein the receiving positioning assistance data containing beam direction information of a beam reference signal of second identification information sent by the LMF entity, comprises:

receiving, by the terminal, positioning assistance data containing beam direction information of a beam reference signal of second identification information sent by the LMF entity and forwarded by a base station that provides services for the terminal.

5. The positioning method of claim 1, wherein the determining location information of the terminal according to each determined RSTD and a beam direction of the each beam reference signal, comprises:

determining first reference location information of the terminal according to the each RSTD and a preset RSTD positioning algorithm;

determining an Angle Of Arrival, AOA, at which a base station that sends a beam reference signal corresponding to each second identification information arrives at the terminal according to a beam direction of the beam reference signal corresponding to the second identification information, and determining second reference location information of the terminal based on a preset AOA positioning algorithm;

determining the location information of the terminal according to preset weight values corresponding to the first reference location information and second reference location information as well as the first reference location information and the second reference location information;

or the determining location information of the terminal according to each determined RSTD and a beam direction of the each beam reference signal, comprises:

determining an AOA at which a base station that sends a beam reference signal corresponding to each second identification information arrives at the terminal according to a beam direction of the beam reference signal corresponding to the second identification information;

determining the location information of the terminal by using a joint positioning algorithm of preset RSTD timing parameters and AOA angle parameters according to each RSTD and each AOA.

6. The positioning method of claim 1, wherein after determining the location information of the terminal, the method further comprises:

sending a positioning information provision message containing the location information of the terminal to the LMF entity.

7. A positioning method applied to a Location Management Function, LMF, entity, comprises:

receiving a positioning assistance data request message sent by a terminal, wherein the positioning assistance data request message contains first identification information of a beam reference signal detected by the terminal;

determining second beam information of a second beam reference signal sent by a neighboring base station and being detectable by the terminal according to the first identification information, and acquiring beam direction information of a beam reference signal containing the second identification information;

sending positioning assistance data containing the beam direction information of the beam reference signal corresponding to the second identification information to the terminal.

8. The positioning method of claim 7, wherein the beam reference signal is a Downlink Reference Signal, DL-RS, and/or a downlink Positioning Reference Signal, DL-PRS;

wherein in response to the beam reference signal being a DL-RS, the positioning assistance data request message further includes signal strength information of the DL-RS;

or in response to the beam reference signal being a DL-RS, the positioning assistance data further comprises a Quasi Co-Location, QCL, association relationship between a DL-RS beam and a DL-PRS beam.

9. The positioning method of claim 7, wherein before the receiving the positioning assistance data request message sent by the terminal, the method further comprises:

sending a positioning capability request message to the terminal when detecting that the terminal is in a Radio Resource Control-CONNECTED, RRC-CONNECTED, state;

receiving a positioning capability provision message containing a positioning capability supported by the terminal sent by the terminal.

10. The positioning method of claim 7, wherein the sending positioning assistance data containing the beam direction information of the beam reference signal corresponding to the second identification information to the terminal, comprises:

sending, by the LMF entity, the positioning assistance data containing the beam direction information of the beam reference signal corresponding to the second identification information to a base station serving the terminal, so that the base station forwards the positioning assistance information to the terminal.

11. The positioning method of claim 7, wherein the acquiring beam direction information of a beam reference signal containing the second identification information, comprises:
sending, by the LMF entity, a DL-TDOA information request message containing the second identification information to each base station in an NR system;
receiving a DL-TDOA information response message sent by each base station in the NR system, wherein the DL-TDOA information response message contains the beam direction information of the beam reference signal corresponding to the second identification information.

12. A Location Management Function, LMF, entity, comprises: a processor, a memory and a transceiver;
wherein the processor is configured to read programs in the memory to implement the positioning method of claim 7.

13. The LMF entity of claim 12, wherein the processor is further configured to: before receiving the positioning assistance data request message sent by the terminal, send a positioning capability request message to the terminal when detecting that the terminal is in a Radio Resource Control-CONNECTED, RRC, state; and receive a positioning capability provision message containing a positioning capability supported by the terminal sent by the terminal.

14. The LMF entity of claim 12, wherein the processor is configured to: send the positioning assistance data containing the beam direction information of the beam reference signal corresponding to the second identification information to a base station serving the terminal, so that the base station forwards the positioning assistance information to the terminal.

15. The LMF entity of claim 12, wherein the beam reference signal is a Downlink Reference Signal, DL-RS, and/or a downlink Positioning Reference Signal, DL-PRS;
wherein in response to the beam reference signal being a DL-RS, the positioning assistance data request message further includes signal strength information of the DL-RS;
or
in response to the beam reference signal being a DL-RS, the positioning assistance data further comprises a Quasi Co-Location, QCL, association relationship between a DL-RS beam and a DL-PRS beam.

16. A terminal, comprises: a processor, a memory and a transceiver;
wherein the processor is configured to read programs in the memory to: send a positioning assistance data request message to a Location Management Function, LMF, entity, wherein the positioning assistance data request message contains first identification information of a beam reference signal detected by the terminal; receive positioning assistance data containing beam direction information of a beam reference signal of second identification information sent by the LMF entity, wherein the second identification information is identification information of a beam reference signal sent by a neighboring base station and is determined according to the first identification information and is detectable by the terminal; determine a Reference Signal Time Difference measurement, RSTD, of each beam reference signal among beam references signals corresponding to the first identification information and beam references signals corresponding to the second identification information, and determine location information of the terminal according to each determined RSTD and a beam direction of the each beam reference signal;
the transceiver is configured to send the positioning assistance data request message to the LMF entity and receive the positioning assistance data containing the beam direction information of the beam reference signal corresponding to the second identification information sent by the LMF entity.

17. The terminal of claim 16, wherein the processor is further configured to: receive a positioning capability request message sent by the LMF entity before the terminal sends the positioning assistance data request message to the LMF entity; and send a positioning capability provision message to the LMF entity, wherein the positioning capability provision message contains a positioning capability supported by the terminal.

18. The terminal of claim 16, wherein the processor is configured to: receive the positioning assistance data containing the beam direction information of the beam reference signal corresponding to the second identification information sent by the LMF entity and forwarded by a base station that provides services for the terminal.

19. The terminal of claim 16, wherein the processor is configured to: determine first reference location information of the terminal according to each RSTD and a preset RSTD positioning algorithm; determine an Angle Of Arrival, AOA, at which a base station that sends a beam reference signal corresponding to each second identification information arrives at the terminal according to a beam direction of the beam reference signal corresponding to the second identification information, and determine second reference location information of the terminal based on a preset AOA positioning algorithm; and determine the location information of the terminal according to preset weight values corresponding to the first reference location information and second reference location information as well as the first reference location information and the second reference location information;
or
the processor is configured to: determine an AOA at which a base station that sends a beam reference signal corresponding to each second identification information arrives at the terminal according to a beam direction of the beam reference signal corresponding to the second identification information; and determine the location information of the terminal by using a joint positioning algorithm of preset RSTD timing parameters and AOA angle parameters according to each RSTD and each AOA.

20. The terminal of claim 16, wherein the beam reference signal is a Downlink Reference Signal, DL-RS, and/or a downlink Positioning Reference Signal, PRS;
wherein in response to the beam reference signal being a DL-RS, the positioning assistance data request message further comprises signal strength information of the DL-RS.

* * * * *